US010649263B2

(12) United States Patent
Chung et al.

(10) Patent No.: US 10,649,263 B2
(45) Date of Patent: May 12, 2020

(54) TOUCH PANEL LIQUID CRYSTAL DISPLAY DEVICE AND METHOD OF DRIVING THE SAME

(71) Applicant: LG Display Co., Ltd., Seoul (KR)

(72) Inventors: Jin-Soo Chung, Paju-si (KR); Tae-Kyoung Sung, Daejeon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/212,570

(22) Filed: Dec. 6, 2018

(65) Prior Publication Data

US 2019/0196240 A1 Jun. 27, 2019

(30) Foreign Application Priority Data

Dec. 27, 2017 (KR) ........................ 10-2017-0180670

(51) Int. Cl.
*G06F 3/041* (2006.01)
*G02F 1/1333* (2006.01)
*G02F 1/133* (2006.01)
*G06F 3/044* (2006.01)

(52) U.S. Cl.
CPC ...... *G02F 1/13338* (2013.01); *G02F 1/13306* (2013.01); *G06F 3/044* (2013.01); *G06F 3/0412* (2013.01); *G06F 3/0416* (2013.01); *G06F 3/0418* (2013.01); *G06F 3/0443* (2019.05); *G06F 3/04164* (2019.05); *G06F 2203/04107* (2013.01)

(58) Field of Classification Search
CPC ............. G02F 1/13306; G02F 1/13338; G06F 3/0412; G06F 3/0416; G06F 3/04164; G06F 3/0418; G06F 3/044; G06F 3/0443; G06F 2203/04107
See application file for complete search history.

(56) References Cited

U.S. PATENT DOCUMENTS

2017/0075487 A1* 3/2017 Huang .............. G02F 1/136286
2017/0102825 A1* 4/2017 Kim ...................... G06F 3/0418

\* cited by examiner

*Primary Examiner* — Stacy Khoo
(74) *Attorney, Agent, or Firm* — Fenwick & West LLP

(57) ABSTRACT

Disclosed are a touch panel LCD device capable of improving touch sensing performance by preventing non-uniformity of raw touch data of left and right sides and a method of driving the same. In the touch panel LCD device, a plurality of common lines arranged in a non-display area of a panel and configured to check characteristics of the panel is connected to a load free driving (LFD) signal line by a flexible printed circuit board (FPCB) when the common lines are attached to the FPCB.

4 Claims, 4 Drawing Sheets

TOUCH PANEL LIQUID CRYSTAL DISPLAY DEVICE AND METHOD OF DRIVING THE SAME

CROSS-REFERENCE TO RELATED APPLICATIONS

This application claims the benefit of Republic of Korea Patent Application No. 10-2017-0180670, filed on Dec. 27, 2017, which is hereby incorporated by reference in its entirety.

BACKGROUND

Field of Technology

The present disclosure relates to a touch panel liquid crystal display device and a method of driving the same and, more particularly, to a touch panel liquid crystal display device for improving touch sensing performance and a method of driving the same.

Discussion of the Related Art

Along with development of multimedia, flat panel display devices have increasingly become important. In accordance with such a trend, flat panel display devices such as a liquid crystal display device, a plasma display device, and an organic light emitting diode display device have been commercialized.

From among the flat panel display devices, a liquid crystal display (LCD) device has been widely used as a mobile flat panel display device due to advantages of superior picture quality, light weight, thin thickness, and low power consumption and has been particularly applied to a variety of products such as notebooks, computer monitors, and televisions.

A touch panel LCD device has been widely used. The touch panel LCD device includes a touch panel stacked on the LCD device to sense a touch point with which a finger of a user or a stylus pen comes in contact through variation in an electrical characteristic such as resistance or capacitance at the touch point and output information corresponding to the touch point or perform an operation.

An application range of such a touch panel LCD device has been extended to small portable terminals, office devices, mobile phones, etc., as a user interface.

However, a scheme in which the touch panel is additionally stacked on the LCD device is disadvantages in that there is a limit to achieving a thin film due to increase in the thickness of the touch panel LCD device, transmittance efficiency of light is reduced when light passes through the stacked panel, and manufacturing costs increase.

To solve the above problems, an in-cell type touch panel LCD device in which a touch sensor is embedded in a pixel region of an LCD device has been proposed.

FIGS. 1 and 2 are schematic cross-sectional views illustrating only a part to which a signal voltage is externally applied in a conventional in-cell type touch panel LCD device. In FIG. 1, an indium tin oxide (ITO) film having a low resistance is used for touch sensing and, in FIG. 2, a Y1 film having a high resistance is used for touch sensing.

The conventional in-cell type touch panel LCD device has a structure, as illustrated in FIG. 1, in which gate lines Gate, data lines Source, and common electrodes Vcom are formed on a thin-film transistor (TFT) array substrate 1, and a black matrix 3 for preventing color mixture of subpixels and a color filter layer 4 formed in each pixel region between the black matrixes 3 are formed on the bottom surface of a color filter array substrate 2.

In addition, an ITO film 5 having a relatively low resistance (a few hundred Q to a few kQ) is formed for touch sensing on the top surface of the color filter array substrate 2. An upper polarizing plate 7 and a lower polarizing plate 6 are formed on the top surface of the ITO film 5 and the bottom surface of the TFT array substrate 1, respectively. The ITO film 5 is formed in an integrated form with the color filter array substrate 2 on the entire top surface of the color filter array substrate 2.

Although not illustrated in the figure, a liquid crystal layer is formed between the TFT array substrate 1 and the color filter array substrate 2.

The ITO film 5 having a low resistance is formed on the substrate to sense touch through self-capacitance. However, since the ITO film 5 is grounded with a low resistance, charges formed during touch leak externally through the ITO film 5. Therefore, when a user's finger touches a touch panel, finger capacitance is formed, thereby deteriorating touch sensing performance.

Accordingly, a Y1 film 8 having a high resistance (a few tens of MΩ) is formed, instead of the ITO film 5, in order to improve touch sensing performance.

That is, as illustrated in FIG. 2, a gate line Gate, a data line Source, and a common electrode Vcom are formed on a TFT array substrate 1, and a black matrix 3 for preventing color mixture of subpixels and a color filter layer 4 formed in each pixel region between the black matrixes 3 are formed on the bottom surface of a color filter array substrate 2.

In addition, the Y1 film 8 having a relatively high resistance (a few tens of MΩ) is formed for touch sensing on the top surface of the color filter array substrate 2. An upper polarizing plate 7 and a lower polarizing plate 6 are formed on the top surface of the Y1 film 8 and the bottom surface of the TFT array substrate 1, respectively. The Y1 film 8 is formed in an integrated form with the color filter array substrate 2 on the top surface of the color filter array substrate 2.

Although not illustrated in the figure, a liquid crystal layer is formed between the TFT array substrate 1 and the color filter array substrate 2.

Therefore, the touch panel LCD device of FIG. 2 using the high-resistance Y1 film for touch sensing has better touch sensing performance than the touch panel LCD device of FIG. 1 using the low-resistance ITO film for touch sensing.

However, the high-resistance Y1 film is expensive and the process thereof is complicated. If the high-resistance Y1 film is not formed, non-uniformity of raw touch data of left and right sides occurs by parasitic capacitance between the black matrix layer formed at the periphery of the touch panel LCD device and a ground line and a common line formed at the periphery of the touch panel LCD device.

FIG. 3 is a diagram schematically illustrating a general touch panel LCD device, FIG. 4 is a diagram for explaining a connection relationship between common lines of a conventional touch panel LCD device to which an FPCB is attached, and FIG. 5 is a driving waveform chart of a conventional touch panel LCD device.

Generally, the touch panel LCD device is a self-capacitive type in-cell touch LCD device and includes a plurality of touch electrodes 11 arranged in a display area of a touch display panel in a matrix form, as illustrated in FIG. 3. One touch electrode 11 is patterned in units of a plurality of adjacent subpixels. That is, one touch electrode 11 is formed of a transparent conductive material such as indium tin oxide (ITO) and performs a common electrode function during a display period. The plural touch electrodes 11 are driven by a plurality of multiplexers MUX 12. Therefore, the multiplexer 12 and corresponding touch electrodes 11 are electrically connected by a touch routing line.

To check characteristics of the touch display panel prior to attaching a driver integrated circuit (IC), first and second even common lines 13 and 14, first and second odd common lines 15 and 16, a ground line 17, an auto-probe (AP) transistor array 18, which connects the first and second even common lines 13 and 14 and the first and second odd common lines 15 and 16 to the respective touch electrodes 11, and signal line 19 are formed in a non-display area located at an outer side of the display area of the touch display panel.

Control signal is applied to the signal line 19 for controlling on/off of each transistor of the AP transistor array 18. All transistors of the AP transistor array 18 are turned on when the characteristics of the panel are checked.

According to the above-described construction, the characteristics of the panel are checked through the lines 13 to 17 and the transistor array 18.

After the characteristics of the panel are checked, a flexible printed circuit board (FPCB) is attached to the touch panel as illustrated in FIG. 4. If the FPCB is attached to the touch panel as illustrated in FIG. 4, the first and second even common lines 13 and 14 and the first and second odd common lines 15 and 16 are connected to a main common line Main Vcom, and the plural touch electrodes 11 are connected to a main common line Main Vcom.

In a state of FIG. 4, the touch panel LCD device is driven. That is, as illustrated in FIG. 5, driving of the touch panel LCD device is divided into a display period D and a touch sensing period T.

During the display period D, a scan signal is sequentially applied to a plurality of gate lines, a data voltage is applied to a plurality of data lines, and a common voltage Vcom is applied to the plural touch electrodes 11, thereby displaying an image. During the touch sensing period T, a load free driving (LFD) signal such as a square wave is applied to the plural touch electrodes 11, thereby sensing touch.

In this case, all transistors of the AP transistor array 18 are turned off and a direct current (DC) voltage is applied to the first and second even common lines 13 and 14 and the first and second odd common lines 15 and 16 which are connected to the main common line, so that the common lines are floated.

Therefore, non-uniformity of raw touch data of left and right sides occurs by parasitic capacitance between the black matrix layer formed at the periphery of the touch panel LCD device and the common lines in the floated state.

SUMMARY

Accordingly, the present disclosure is directed to a touch panel LCD device and a method of driving the same that substantially obviates one or more problems due to limitations and disadvantages of the related art.

An object of the present disclosure is to provide a touch panel LCD device capable of improving touch sensing performance by preventing non-uniformity of raw touch data of left and right sides, and a method of driving the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a touch panel liquid crystal display (LCD) device includes a plurality of common lines arranged in a non-display area of a panel and configured to check characteristics of the panel. When the plural common lines are attached to a flexible printed circuit board (FPCB), the common lines are connected to a load free driving (LFD) signal line by the FPCB.

In another aspect of the present invention, a method of driving a touch panel liquid crystal display (LCD) device includes applying, during a touch sensing period, a load free driving (LFD) signal to a plurality of common lines arranged in a non-display area of a panel and configured to check characteristics of the panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the exemplary embodiments of the present disclosure, examples of which are illustrated in the accompanying drawings. Wherever possible, the same reference numbers will be used throughout the drawings to refer to the same or like parts.

A touch panel LCD device and a method of driving the same according to the present disclosure will now be described in detail with reference to the attached drawings.

Figure 6:
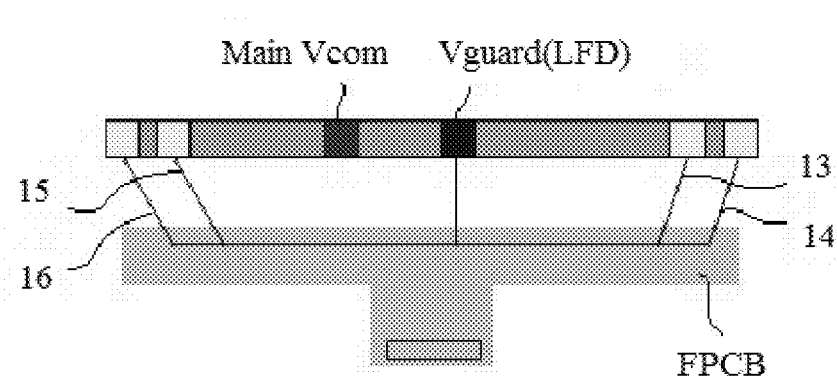
FIG. 6 is a diagram for explaining a connection relationship between common lines of a touch panel LCD device to which an FPCB is attached according to one embodiment of the present disclosure.

FIG. 6 is a diagram for explaining a connection relationship between common lines of a touch panel LCD device to which an FPCB is attached according to one embodiment of the present disclosure.

Figure 1:
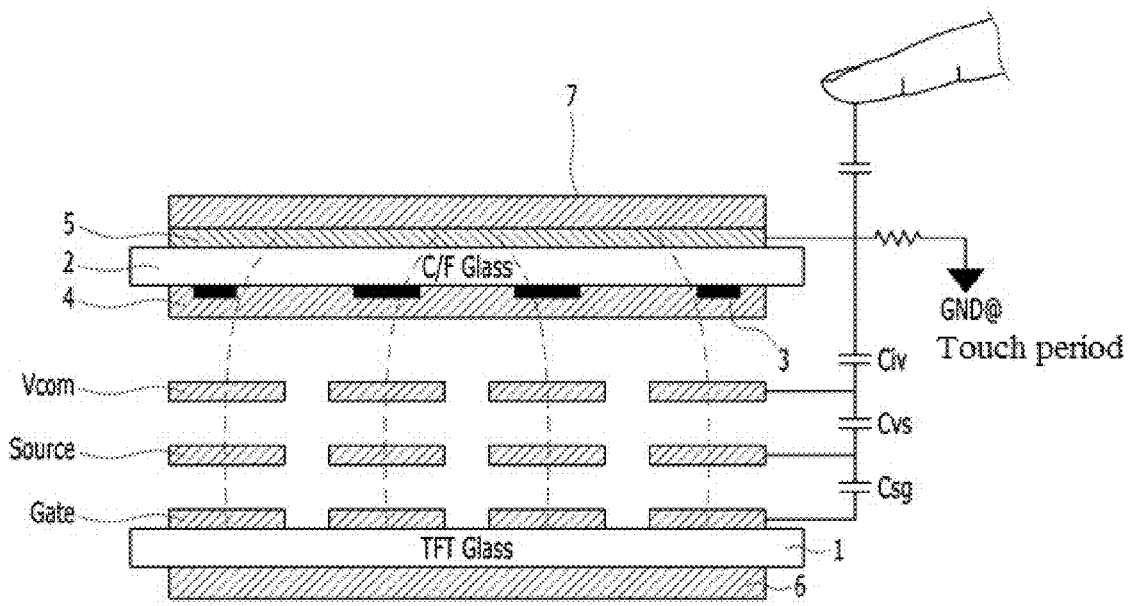
FIG. 1 is schematic cross-sectional views of a conventional in-cell type touch panel LCD device using a low-resistance ITO film.
Figure 2:
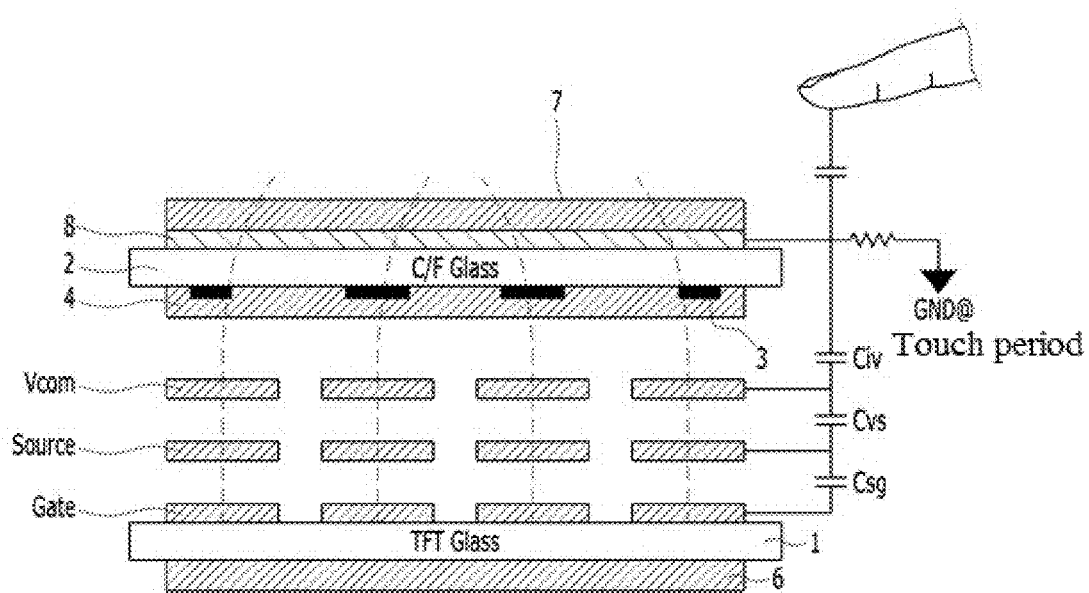
FIG. 2 is a schematic cross-sectional view of a conventional in-cell type touch panel LCD device using a high-resistance Y1 film.
Figure 3:
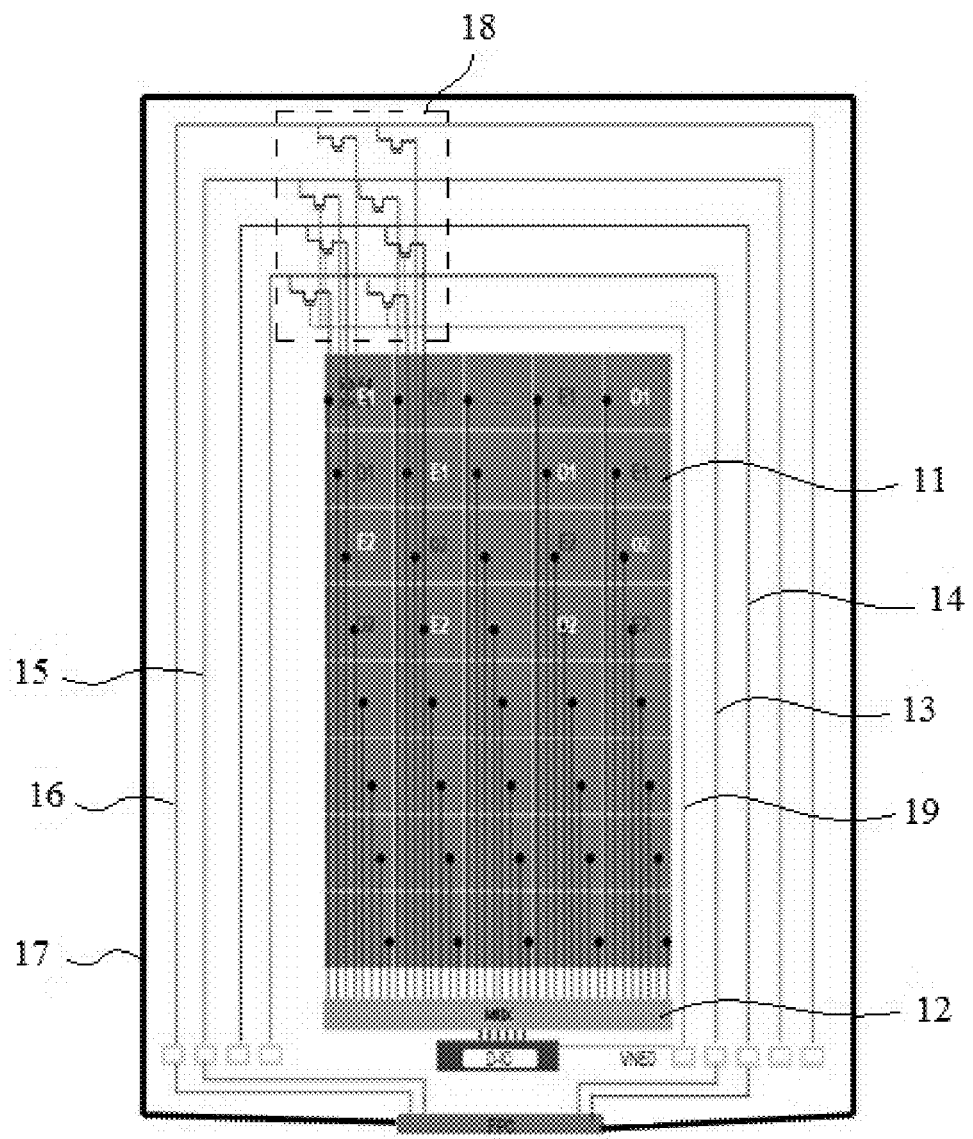
FIG. 3 is a diagram schematically illustrating a conventional touch panel LCD device.
Figure 4:
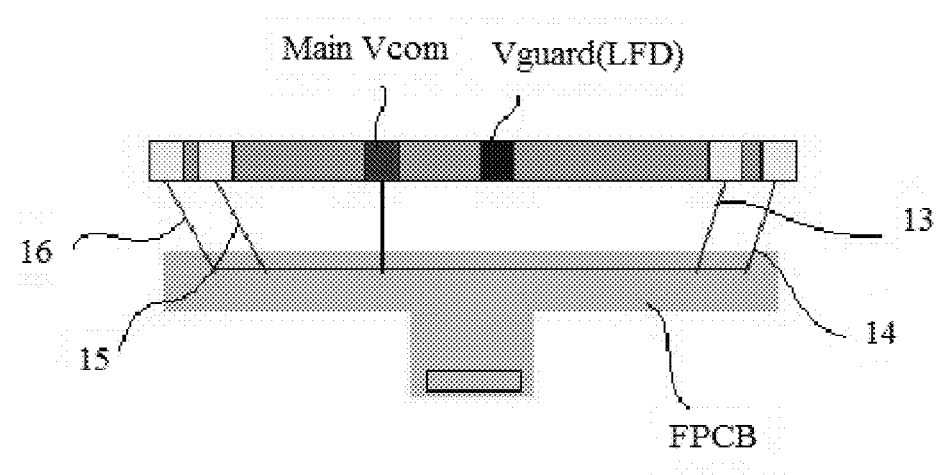
FIG. 4 is a diagram for explaining a connection relationship between common lines of a conventional touch panel LCD device to which an FPCB is attached.
Figure 5:
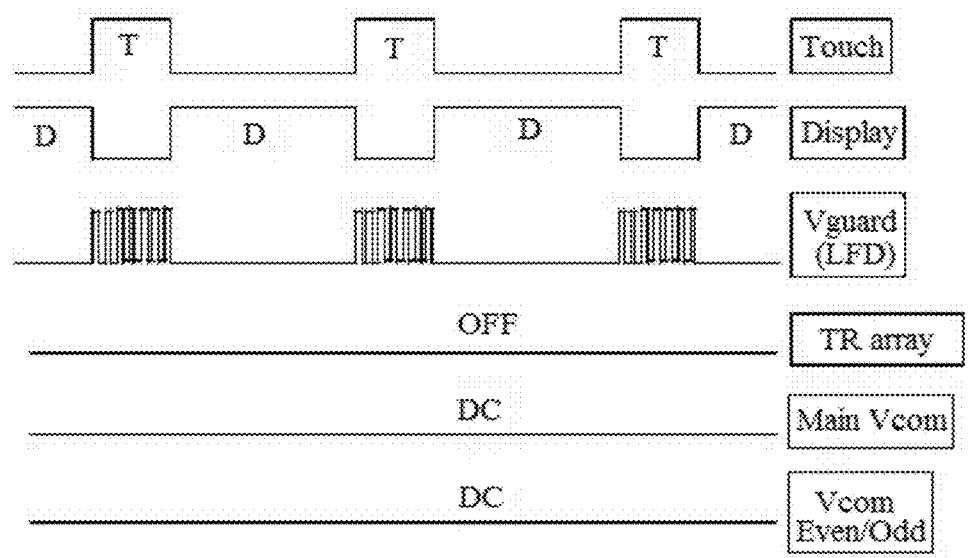
FIG. 5 is a driving waveform chart of a conventional touch panel LCD device.

Even in the touch panel LCD device according to an embodiment of the present disclosure, as illustrated in FIG. 3, first and second even common lines 13 and 14, first and second odd common lines 15 and 16, a ground line 17, and an AP transistor array 18, which connects the first and second even common lines 13 and 14 and the first and second odd common lines 15 and 16 to the respective touch electrodes 11, are formed in a non-display area located at an outer side of a display area.

That is, the touch panel LCD device according to the present disclosure is a self-capacitive type in-cell touch panel LCD device and includes a plurality of touch electrodes 11 arranged in the display area of a touch display panel in a matrix form. One touch electrode 11 is patterned in units of a plurality of adjacent subpixels. That is, one touch electrode 11 is formed of a transparent conductive material such as indium tin oxide (ITO) and performs a common electrode function during a display period. The plural touch electrodes 11 are driven by a plurality of multiplexers MUX 12. Therefore, the multiplexer 12 and corresponding touch electrodes 11 are electrically connected by a touch routing line.

To check the characteristics of the touch display panel prior to attaching a driver IC, the first and second even common lines 13 and 14, the first and second odd common lines 15 and 16, the AP transistor array 18, which connects the first and second even common lines 13 and 14 and the first and second odd common lines 15 and 16 to the respective touch electrodes 11, and signal line 19 for controlling on/off of each transistor of the AP transistor array 18 are formed in the non-display area located at the outer side of the display area of the touch display panel.

According to the above-described construction, for checking the characteristics of the panel, all transistors of the AP transistor array 18 are turned on.

After the characteristics of the panel are checked, a FPCB is attached to the touch panel as illustrated in FIG. 6. If the FPCB is attached to the touch panel as illustrated in FIG. 6, the first and second even common lines 13 and 14 and the first and second odd common lines 15 and 16 are connected to an LFD signal line Vguard (LFD), and the plural touch electrodes 11 are connected to a main common line Main Vcom.

In a state of FIG. 6, the touch panel LCD device is driven.

Figure 7:
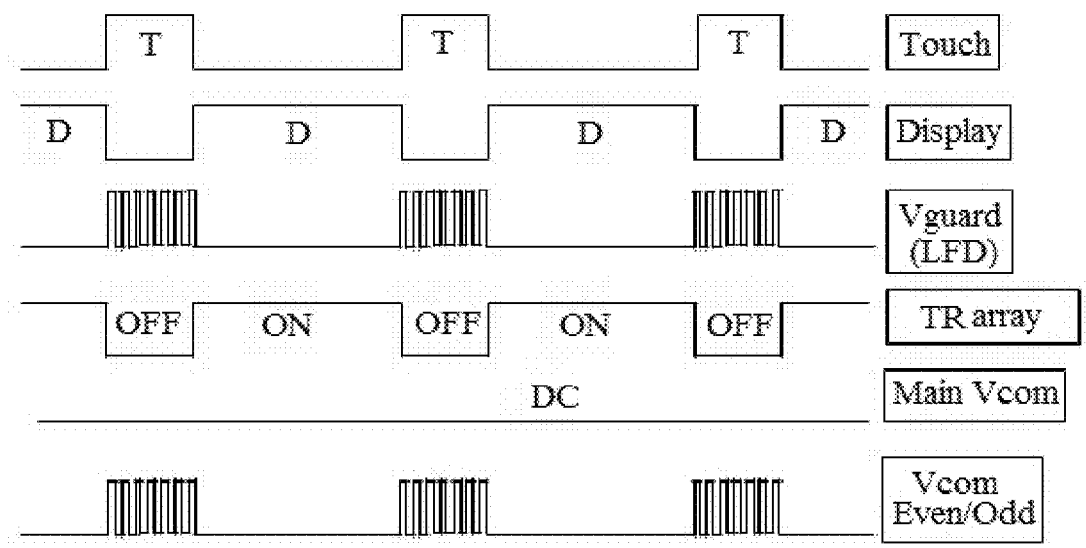
FIG. 7 is a driving waveform chart of a touch panel LCD device according to the one embodiment of the present disclosure.

FIG. 7 is a driving waveform chart of a touch panel LCD device according to the present disclosure.

That is, as illustrated in FIG. 7, driving of the touch panel LCD device is divided into a display period D and a touch sensing period T.

During the display period D, a scan signal is sequentially applied to a plurality of gate lines, a data voltage is applied to a plurality of data lines, and a common voltage Vcom is applied to the plural touch electrodes 11, thereby displaying an image. During the touch sensing period T, an LFD signal such as a square wave is applied to the plural touch electrodes 11, thereby sensing touch.

In this case, all transistors of the AP transistor array 18 are turned on during the display period D and are turned off during the touch sensing period T. In addition, during the touch sensing period T, the LFD signal is applied to the first and second even common lines 13 and 14 and the first and second odd common lines 15 and 16.

Therefore, since the LFD signal is applied to the first and second even common lines 13 and 14 and the first and second odd common lines 15 and 16 during the touch sensing period T, parasitic capacitance does not occur between a black matrix layer and the common lines, formed at the periphery of the touch panel LDC device, and thus touch electrodes are normally operated, thereby preventing non-uniformity of raw touch data of left and right sides.

The touch panel LCD device having the above-described characteristics according to the present disclosure and a method of driving the same have the following effects.

That is, since the LFD signal is applied to the first and second even common lines and the first and second odd common lines during the touch sensing period, parasitic capacitance does not occur between the black matrix layer and the common lines, formed at the periphery of the touch panel LDC device, and touch electrodes are normally operated, thereby preventing non-uniformity of raw touch data of left and right sides.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A touch panel liquid crystal display (LCD) device, comprising:
    a plurality of touch electrodes arranged in a display area of a panel in a matrix form;
    a plurality of checking lines arranged in a non-display area of the panel and configured to check characteristics of the panel; and
    an auto-probe (AP) transistor array configured to electrically connect or disconnect the plurality of checking lines from the plurality of touch electrodes based on a control signal,
    wherein the plurality of checking lines are connected to a load free driving (LFD) signal line by a flexible printed circuit board (FPCB).

2. The touch panel liquid crystal display LCD device of claim 1, wherein the plurality of touch electrodes are connected to a main common line by the flexible printed circuit board.

3. A method of driving a touch panel liquid crystal display (LCD) device including a plurality of checking lines arranged in a non-display area of a panel and configured to check characteristics of the panel, and an auto-probe (AP) transistor array configured to switch between the plurality of checking lines and a plurality of touch electrodes by a control signal, the method comprising:
    applying a load free driving (LFD) signal to the plurality of checking lines during a touch sensing period.

4. The method of claim 3, further comprising turning on all transistors of the auto-probe (AP) transistor array during a display period and turning off all the transistors of the auto-probe (AP) transistor array during the touch sensing period.

* * * * *